(12) United States Patent
Sakurai

(10) Patent No.: US 8,463,125 B2
(45) Date of Patent: Jun. 11, 2013

(54) OPTICALLY VARIABLE FILTER ARRAY APPARATUS

(75) Inventor: Yasuki Sakurai, Aichi (JP)

(73) Assignee: Santec Corporation, Komaki (JP)

( * ) Notice: Subject to any disclaimer, the term of this patent is extended or adjusted under 35 U.S.C. 154(b) by 343 days.

(21) Appl. No.: 12/878,571

(22) Filed: Sep. 9, 2010

(65) Prior Publication Data
US 2011/0268445 A1 Nov. 3, 2011

(30) Foreign Application Priority Data
Apr. 30, 2010 (JP) ................. 2010-105401

(51) Int. Cl.
*H04J 14/02* (2006.01)
*H04B 10/00* (2006.01)

(52) U.S. Cl.
USPC .............................. 398/79; 398/138; 398/139

(58) Field of Classification Search
USPC .......................................................... 398/79
See application file for complete search history.

(56) References Cited

U.S. PATENT DOCUMENTS

| | | | |
|---|---|---|---|
| 6,449,410 | B1 | 9/2002 | Que |
| 6,628,383 | B1 * | 9/2003 | Hilliard .......... 356/305 |
| 6,776,510 | B1 * | 8/2004 | Shimaoka et al. ........... 362/298 |
| 8,346,086 | B2 * | 1/2013 | Suzuki et al. ................... 398/79 |
| 2002/0176149 | A1 * | 11/2002 | Davis et al. .................... 359/290 |
| 2002/0176151 | A1 * | 11/2002 | Moon et al. ................... 359/298 |
| 2009/0263142 | A1 | 10/2009 | Shen et al. | |

FOREIGN PATENT DOCUMENTS

| | | |
|---|---|---|
| JP | 05-196910 A | 8/1993 |
| JP | 11-023891 A | 1/1999 |
| JP | 2000-028931 A | 1/2000 |

OTHER PUBLICATIONS

J. D. Berger et al., "Widely Tunable, Narrow Optical Bandpass Gaussian Filter Using a Silicon Microactuator," in Optical Fiber Communication Conference, Technical Digest (Optical Society of America, 2003), paper TuN2, Mar. 25, 2003, Atlanta, Georgia.

* cited by examiner

*Primary Examiner* — Kenneth N Vanderpuye
*Assistant Examiner* — Abbas H Alagheband
(74) *Attorney, Agent, or Firm* — McGlew and Tuttle, P.C.

(57) ABSTRACT

In an optically variable filter array apparatus, WDM-signal light beams of m channels ranging in wavelength from $\lambda_1$ to $\lambda_n$ from optical fibers 11-1 to 11-$m$ enter wavelength dispersion element 17. Wavelength dispersion element 17 disperses incident light beams in different directions according to their wavelengths. In lens 18, light beams of different channels are turned into strip-like parallel light beams and developed over xy plane according to channel and wavelength. Wavelength selection element 19 has pixels arranged in lattice pattern, for bringing a pixel at a position corresponding to to-be-selected channel and wavelength into a reflective state. Light beams reflected from wavelength selection element 19 pass through the same path to exit from optical fibers 15-1 to 15-$m$. By changing reflection characteristics of wavelength selection element 19 on a pixel-by-pixel basis, characteristics of optical filter can be varied, so that desired wavelengths of given WDM light can be selected.

8 Claims, 11 Drawing Sheets

F I G. 5 A
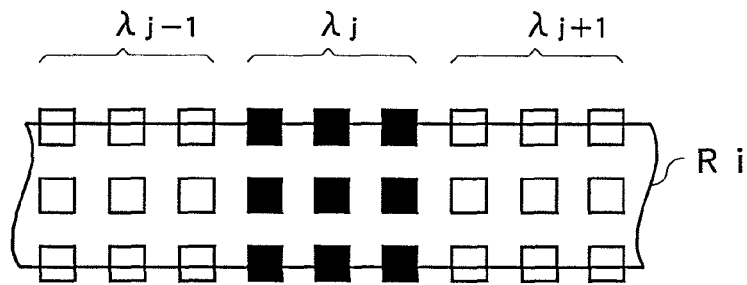
F I G. 5 B
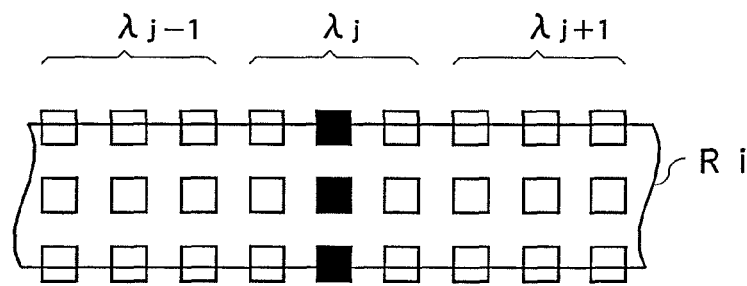
F I G. 5 C
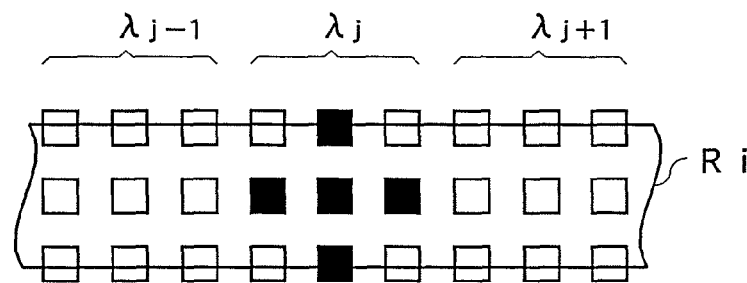
F I G. 5 D
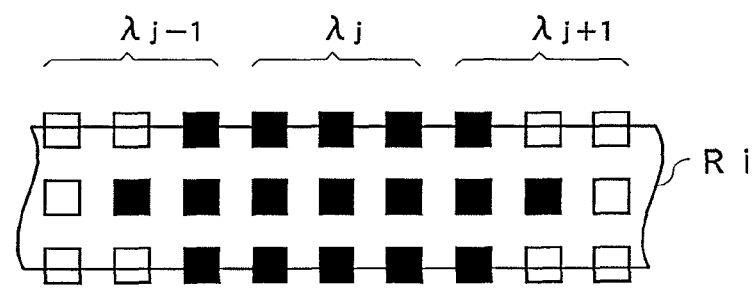

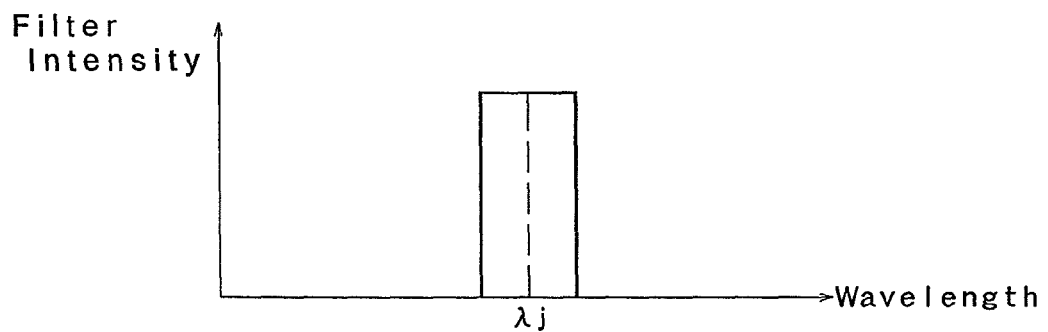
F I G. 6A
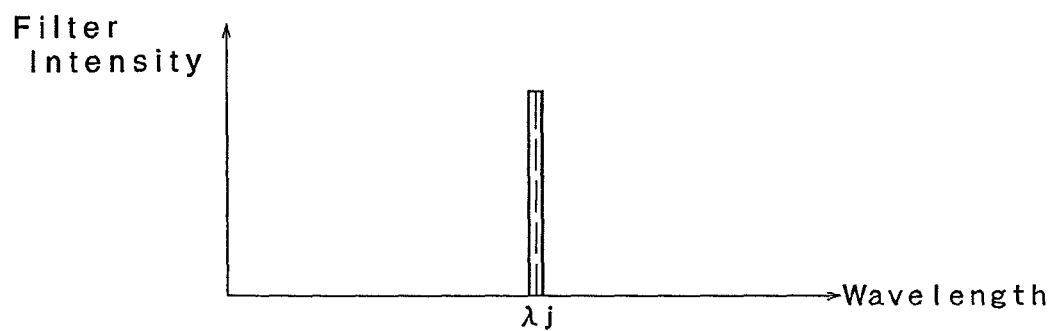
F I G. 6B
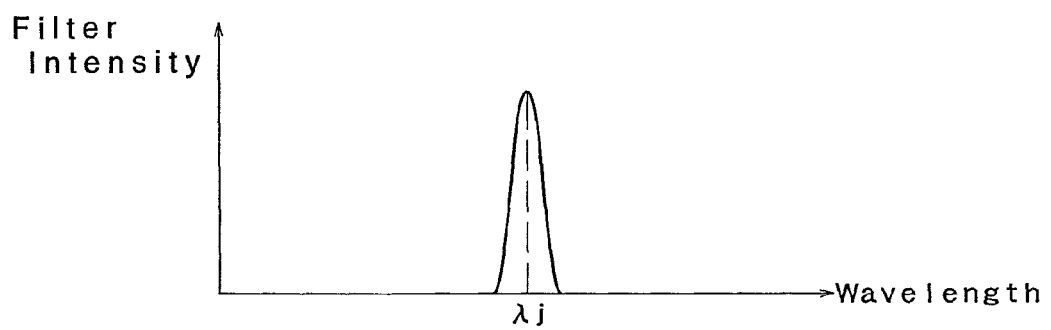
F I G. 6C
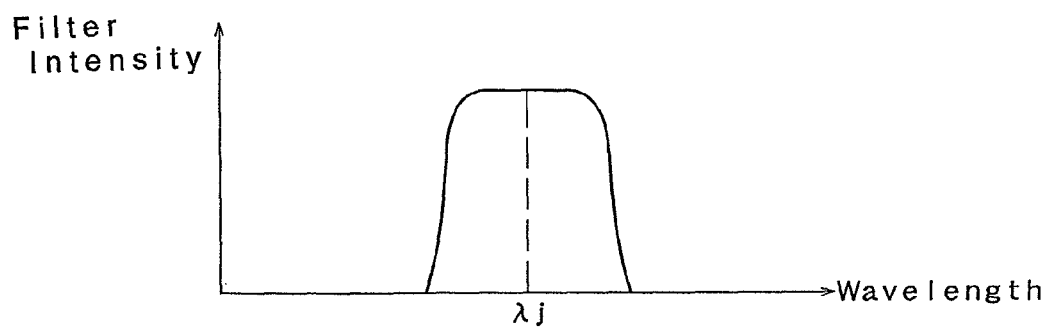
F I G. 6D F I G. 1 1 A
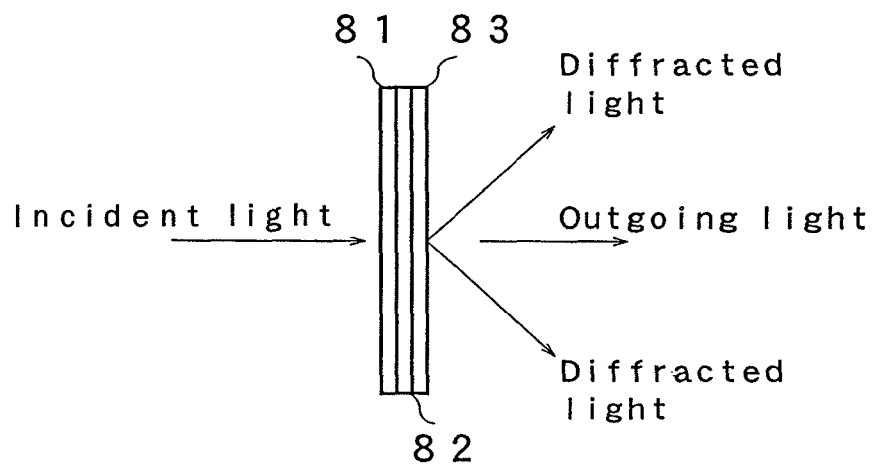
F I G. 1 1 B
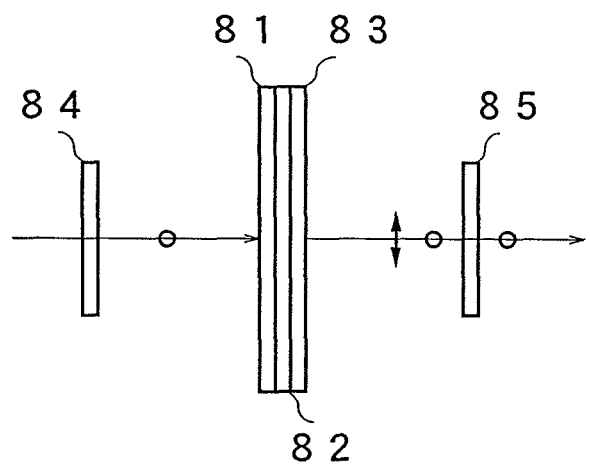

OPTICALLY VARIABLE FILTER ARRAY APPARATUS

BACKGROUND OF THE INVENTION

1. Field of the Invention

The present invention relates to an optically variable filter array apparatus suitable for use in selection of WDM signals.

2. Discussion of the Related Art

At present ROADM (Reconfigurable Optical Add Drop-multiplexing) nodes for WDM (Wavelength Domain Multiplex) communication systems are required to offer a sophisticated colorless Add-Drop function, or equivalently the capability of effecting separation and addition of optical signals having desired wavelengths. As exemplary of methods to achieve a colorless feature, there is known a structure using a wavelength variable filter array (TFA) for selecting a plurality of input signals from among input WDM signals. In Japanese Unexamined Patent Publication JP-A 11-23891 (1999) and Japanese Unexamined Patent Publication JP-A 5-196910 (1993) as well, as a wavelength variable filter array structure of conventional design, there is proposed an optically variable filter that utilizes variation in cavity length resulting from an electrical-field effect in a liquid crystal element. Moreover, in Japanese Unexamined Patent Publication JP-A 2000-28931 and U.S. Pat. No. 6,449,410 as well, there is proposed a wavelength variable filter for varying selected wavelengths by exploiting variation in cavity length resulting from mechanical alteration in MEMS. Further, in US 2009/0263142 A1, there is proposed a filter constructed by integrating a multiplicity of filter elements on a waveguide utilizing Thermo-Optical effects (TO effects) exerted by the waveguide. Still further, in Conference paper TuN2 of OFC 2003 by J. Berger, F. Ilkov, D. King, A. Tselikov, and D. Anthon, there is presented a tunable filter constructed of a combination of a diffraction grating and MEMS. In this case, MEMS and input-output optical fibers designed in an array form can be utilized as a TFA.

SUMMARY OF THE INVENTION

Since a WDM modulated signal exhibits a spread of spectral components on a frequency axis, as a filter configuration, a flat-top spectral waveform pattern is desirable that is characterized by inclusion of signal spectral components and low level of crosstalk between adjacent channels. However, the filter configuration of a Fabry-Perot interferometer is of Lorentzian type, which is unsuitable for a filter for selecting specific wavelengths of WDM signals due to too narrow a peak range of a selected wavelength. Furthermore, in the filter disclosed in US 2009/0263142 A1, because of the exploitation of TO effects, there arises the problem of an increase in power consumption ascribable to array configuration. In addition, in the filter presented in Conference paper TuN2 of OFC 2003 by J. Berger, F. Ilkov, D. King, A. Tselikov, and D. Anthon, the filter configuration is of Gaussian-waveform pattern and is therefore, just like others of the conventional art, unsuitable for a filter for WDM signals.

The present invention has been made with consideration given to the drawbacks associated with the conventional art, and accordingly its object is to provide an optically variable filter array apparatus capable of input of WDM signals corresponding to a plurality of channels and selecting a desired wavelength with respect to a given channel.

An optically variable filter array apparatus of the present invention comprises: an entrance/exit section for a plurality of channels arranged along a direction of a y axis, which receives WDM signal light beams of a first to m-th channels, each of which is composed of multi-wavelength light, and allows exit of optical signals of selected multiplex wavelengths on a channel to channel basis; a wavelength dispersion element which spatially disperses said WDM signal light beams of different channels according to their wavelengths; a light condensing element which condenses the WDM light beams of different channels dispersed by said wavelength dispersion element on a two-dimensional xy plane; a wavelength selection element which has a multiplicity of pixels that are arranged in a direction of an x axis according to wavelength, are placed so as to receive incoming light beams of m channels arranged at different positions with respect to the y axis so as to be developed over the xy plane, and are arranged in a lattice pattern on the xy plane, and which selects light in a desired number of wavelength bands with respect to a desired number of said light beams by changing reflection characteristics of each of the pixels arranged in a two-dimensional fashion; and a wavelength selection element driving unit which drives an electrode of each of the pixels arranged in the x-y directions of said wavelength selection element to control light reflection characteristics of a pixel lying at a predetermined position in the x-axis direction as well as in the y-axis direction.

In the optically variable filter array apparatus, said entrance/exit section may include circulators for feeding said incident WDM signals of the first to m-th channels to said wavelength dispersion element and effecting separation of reflection characteristics-controlled WDM signal light produced from said wavelength dispersion element.

In the optically variable filter array apparatus, said wavelength selection element may be inclined relative to the x-axis direction.

In the optically variable filter array apparatus, said wavelength selection element may be a two-dimensional liquid crystal element, and said wavelength selection element may control a voltage to be applied to each pixel in accordance with a wavelength of a channel to be selected.

In the optically variable filter array apparatus, said wavelength selection element may be an LCOS element.

In the optically variable filter array apparatus, said LCOS element may be so designed that a plurality of pixels are assigned to an incident position where light in a single wavelength band of a single channel of a WDM signal enters.

In the optically variable filter array apparatus, said wavelength selection element may be a two-dimensional liquid crystal array element.

In the optically variable filter array apparatus, said wavelength selection element may be a MEMS array having a plurality of pixels arranged in a two-dimensional fashion.

An optically variable filter array apparatus of the present invention comprises: an entrance section which is arranged along a direction of a y axis and receives WDM signal light beams of a first to m-th channels composed of multi-wavelength light; a first dispersion element which spatially disperses said WDM signal light beams of different channels according to their wavelengths; a first light condensing element which condenses the WDM light beams of different channels dispersed by said first dispersion element on a two-dimensional xy plane; a wavelength selection element which has a multiplicity of pixels that are arranged in a direction of an x axis according to wavelength, are placed so as to receive incoming light beams of m channels arranged at different positions with respect to the y axis so as to be developed over the xy plane, and are arranged in a lattice pattern on the xy plane, and which selects light in a desired number of wavelength bands with respect to a desired number of light beams by changing transmission characteristics of each of the pixels arranged in a two-dimensional fashion; a wavelength selection element driving unit which drives electrodes arranged in the x-y directions of said wavelength selection element to control light transmission characteristics of a pixel lying at a predetermined position in the x-axis direction as well as in the y-axis direction; a second light condensing element which condenses light beams of different wavelengths transmitted through said wavelength selection element; a second wavelength dispersion element which effects synthesis of dispersed light condensed by said second light condensing element; and an exit section corresponding to a plurality of channels, which allows exit of WDM signals of selected wavelengths on a channel to channel basis.

In the optically variable filter array apparatus, said wavelength selection element may be a two-dimensional liquid crystal element, and said wavelength selection element may be control a voltage to be applied to each pixel in accordance with a wavelength of a channel to be selected.

In the optically variable filter array apparatus, said wavelength selection element may be an LCOS element.

In the optically variable filter array apparatus, said LCOS element may be so designed that a plurality of pixels are assigned to an incident position where light in a single wavelength band of a single channel of a WDM signal enters.

In the optically variable filter array apparatus, said wavelength selection element may be a two-dimensional liquid crystal array element.

As particularized heretofore, according to the present invention, by making various changes to the reflection characteristics and transmission characteristics of a wavelength selection element, it is possible to select light of a desired wavelength with respect to each of multi-channel WDM signals on an individual basis. Moreover, the use of a wavelength selection element in which a plurality of pixels are assigned to each wavelength band makes it possible to vary wavelength selection characteristics freely.

BRIEF DESCRIPTION OF THE DRAWINGS

FIGS. 5A to 5D are diagrams showing how the LCOS element is to be driven;

FIGS. 6A to 6D are diagrams showing the selection characteristics of the filter corresponding to the driving conditions of the LCOS element;

FIG. 11A is a diagram showing an example of a modulation mode for an LCOS element employed in the third embodiment of the present invention; and FIG. 11B is a diagram showing another example of the modulation mode for the LCOS element employed in the third embodiment of the present invention.

DESCRIPTION OF THE PREFERRED EMBODIMENTS

First Embodiment

Figure 1A:
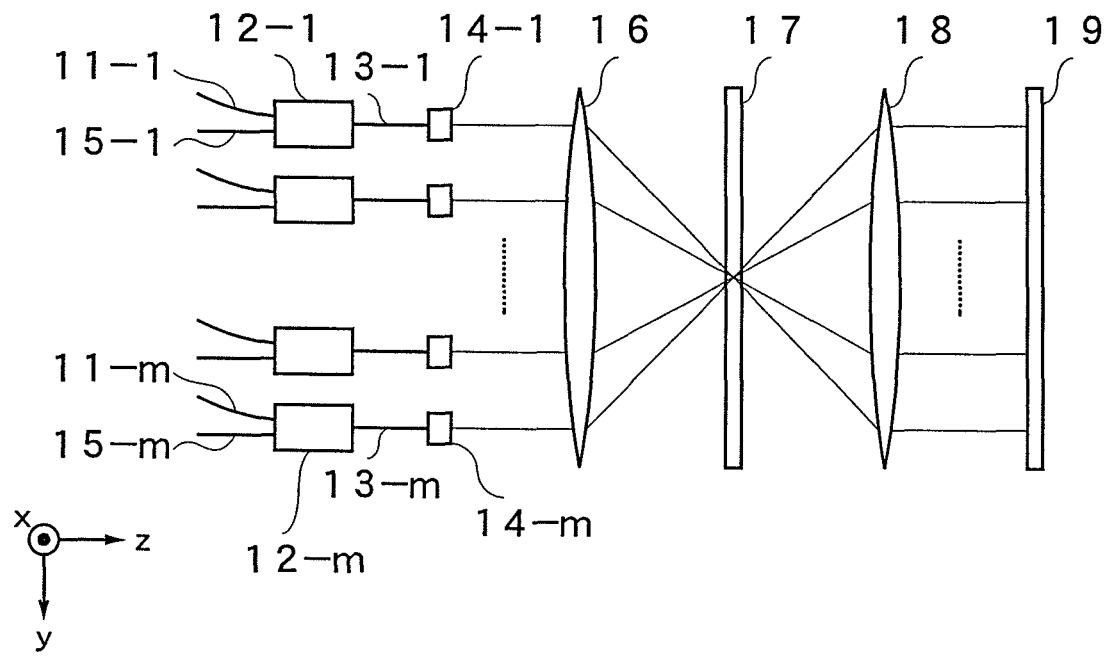
FIG. 1A is a diagram showing the optical arrangement of a reflection-type optically variable filter array in accordance with a first embodiment of the present invention as seen in the direction of an x axis.
Figure 1B:
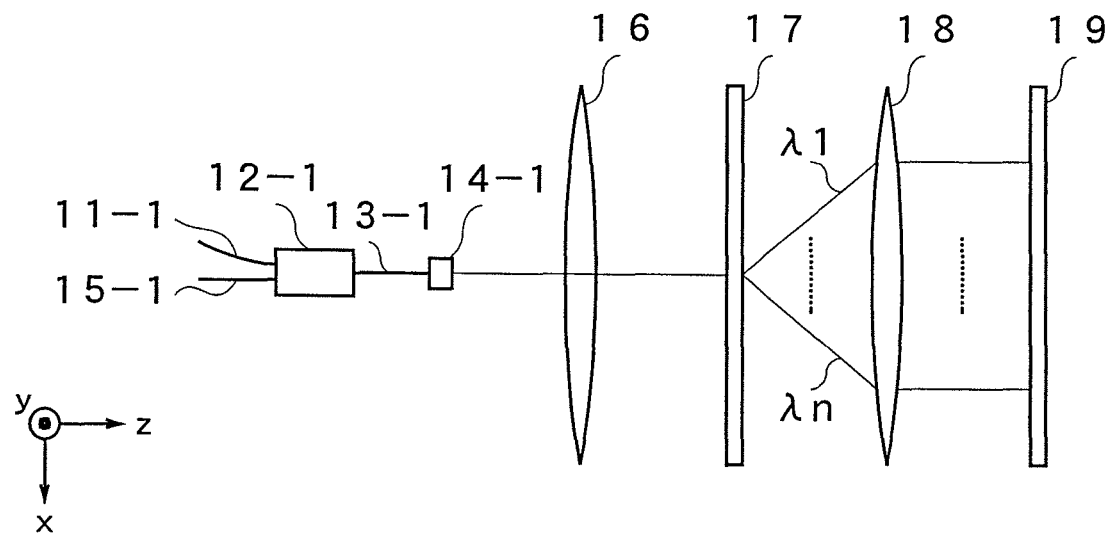
FIG. 1B is a diagram showing the optical arrangement of the optically variable filter array as seen in the direction of a y axis.

FIG. 1A is a side view showing the configuration of optical elements constituting a reflection-type optically variable filter array apparatus in accordance with a first embodiment of the present invention as seen in the direction of an x axis. FIG. 1B is a side view showing the apparatus as seen in the direction of a y axis. Incoming light is WDM signal light corresponding to m channels, and WDM light of each channel results from multiplexing of optical signals ranging in wavelength from $\lambda_1$ to $\lambda_n$. The beams of WDM light of the first to m-th channels are fed, through optical fibers 11-1 to 11-$m$, respectively, to circulators 12-1 to 12-$m$, respectively. The beams of incoming light can be either inputted to their respective circulators 12-1 to 12-$m$ via their respective optical fibers 11-1 to 11-$m$ or inputted directly to the circulators. The circulators 12-1 to 12-$m$ allow the incoming light beams to exit, through optical fibers 13-1 to 13-$m$, respectively, to collimator lenses 14-1 to 14-$m$, respectively, and also allow light beams coming from the optical fibers 13-1 to 13-$m$, respectively, to exit to optical fibers 15-1 to 15-$m$, respectively. Moreover, the light beams that exited from their respective collimator lenses 14-1 to 14-$m$ via their respective optical fibers 13-1 to 13-$m$ are parallel to each other in the direction of a z axis. The beams of WDM light of all the channels are condensed into a spot at a focal point by a lens 16 to enter a wavelength dispersion element 17 placed at the light condensing position. The wavelength dispersion element 17 acts to disperse light in different directions relative to the x-axis direction according to wavelength. Herein the wavelength dispersion element 17 may be constructed of a transmission-type or reflection-type diffraction grating or a prism or the like, or may be constructed of a combination of a diffraction grating and a prism. The dispersed light beams from the wavelength dispersion element 17 are fed to a lens 18. The lens 18 is a light condensing element for condensing light beams dispersed on an xz plane in a direction parallel to the z axis. The condensed light is incident perpendicularly on a wavelength selection element 19.

It is noted that, in FIG. 1B, there are shown light having the shortest wavelength $\lambda_1$ and light having the longest wavelength $\lambda_n$ by way of example. However, incoming light is in reality WDM signal light having a multiplicity of spectra in a range from the wavelength $\lambda_1$ to the wavelength $\lambda_n$. Therefore the beams of WDM signal light corresponding to m channels developed over the xz plane are directed, in a strip-like form, to the wavelength selection element 19. The wavelength selection element 19 effects reflection of incoming light in a selective manner. The selection characteristics of the optical filter are determined on the basis of the reflection characteristics of the wavelength selection element 19, which will hereinafter be described in detail. The light beams reflected from the wavelength selection element 19 pass through the same path to enter the lens 18, and are then directed to the wavelength dispersion element 17 once again. In the wavelength dispersion element 17, the reflected light is condensed in the same direction as the condensing direction of the original incoming light, and the condensed light is incident on the lens 16. The lens 16 turns the light into light beams parallel to the z-axis direction in the same path as that taken by the incoming light, and the light beams exit, through their respective collimator lenses 14-1 to 14-m, to their respective optical fibers 13-1 to 13-m. The light beams are then outputted to their respective optical fibers 15-1 to 15-m by their respective circulators 12-1 to 12-m. Herein the optical fibers 11-1 to 11-m, 13-1 to 13-m, and 15-1 to 15-m, the circulators 12-1 to 12-m, the collimator lenses 14-1 to 14-m, and the lens 16 constitute an entrance/exit section for receiving WDM signal light beams of m channels and allowing the exit of selected light. It is noted that the circulators 12-1 to 12-m do not necessarily have to be fiber-type circulators. When using spatial-type circulators, there is no need to provide the optical fibers 13-1 to 13-m.

Second Embodiment

Figure 2A:
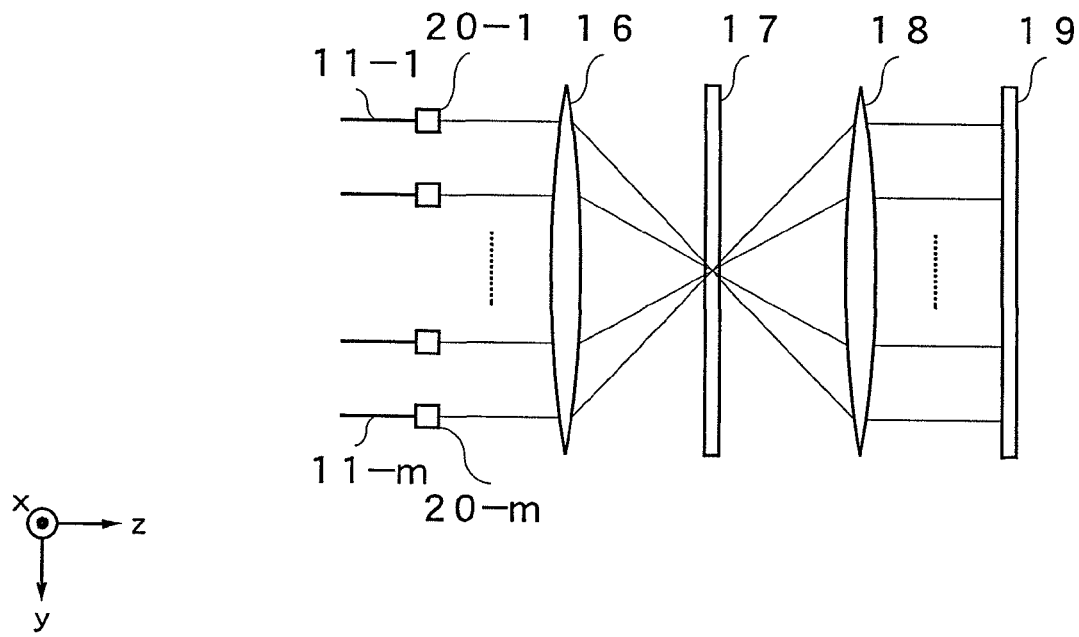
FIG. 2A is a diagram showing the optical arrangement of a reflection-type optically variable filter in accordance with a second embodiment of the present invention as seen in the x-axis direction.
Figure 2B:
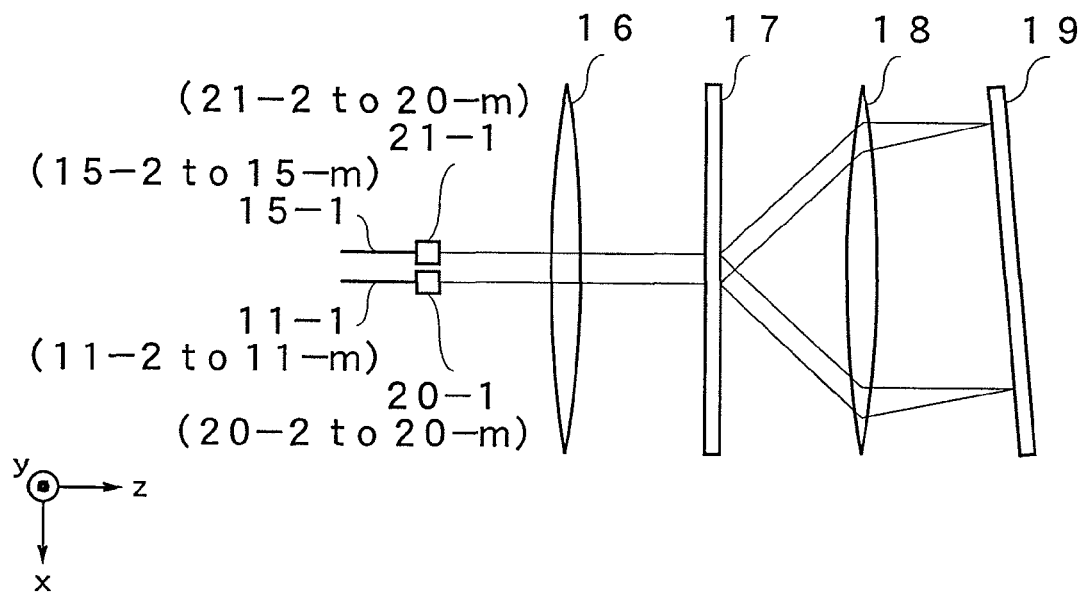
FIG. 2B is a diagram showing the optical arrangement of the optically variable filter as seen in the y-axis direction.

Next, a description will be given as to the reflection-type optically variable filter array apparatus in accordance with a second embodiment of the present invention. FIG. 2A is a side view showing the configuration of optical elements constituting the optically variable filter array apparatus in accordance with the second embodiment of the present invention as seen in the x-axis direction. FIG. 2B is a side view showing the apparatus as seen in the y-axis direction. Such constituent components as are common to the first embodiment will be identified with the same reference symbols. In this embodiment, light beams that exited from optical fibers 11-1 to 11-m, respectively, are inputted to a lens 16 through collimators 20-1 to 20-m, respectively. Moreover, as shown in FIG. 2B, a wavelength dispersion element 17 is so designed that incoming light and outgoing light take up different positions in the z-axis direction. From there the light is incident on a wavelength selection element 19 through a lens 18. On the exit side, optical fibers 15-1 to 15-m are arranged in parallel with the optical fibers 11-1 to 11-m. Similarly, collimators 21-1 to 21-m are arranged in parallel with the collimators 20-1 to 20-m. As shown in FIG. 2B, the wavelength selection element 19 is slightly inclined relative to the X axis, whereby separation between incoming light and outgoing light can be achieved without the necessity of using the circulators 12-1 to 12-m.

(Configuration of Wavelength Selection Element)

Figure 3:
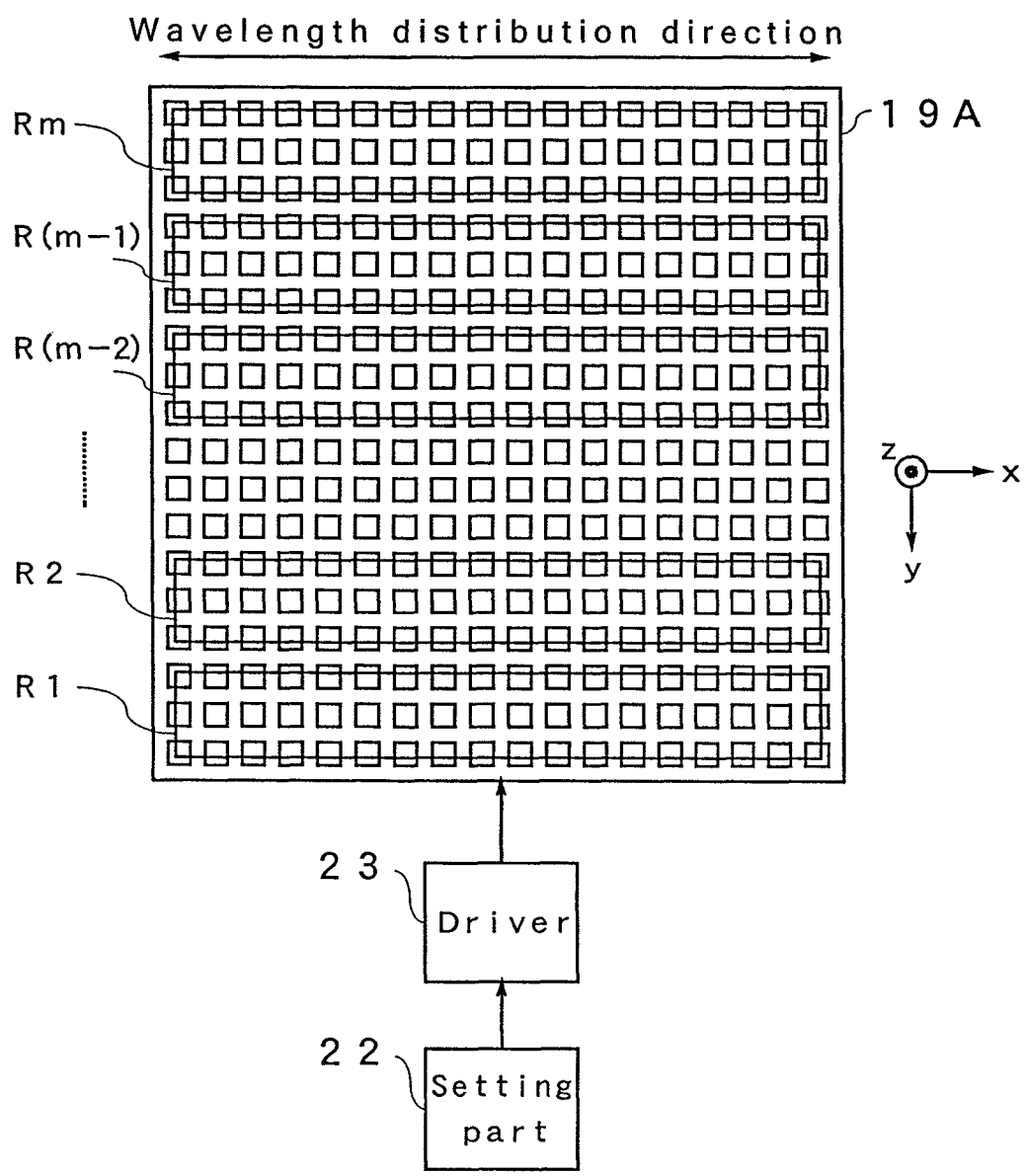
FIG. 3 is a diagram showing an LCOS element employed in an optically variable filter array apparatus in accordance with the first and second embodiments of the present invention.

Next, the wavelength selection element 19 employed in the reflection-type optically variable filter array apparatus in accordance with the first and second embodiments will be explained. As shown in FIG. 3, the wavelength selection element 19 is designed as an element having a structure composed of pixels two-dimensionally arranged in a K- by L-dot matrix. Moreover, a setting section 22 is connected, via a driver 23, to the wavelength selection element 19. The setting section 22 determines which pixel is used to reflect light on the xy plane in accordance with a selected wavelength of a selected channel. The setting section 22 and the driver 23 constitute a wavelength selection element driving unit for driving the electrode of each of the pixels arranged in the x-y directions of the wavelength selection element, so that the light reflection characteristics of a pixel at a predetermined position in the x-axis and y-axis directions can be controlled.

In the first and second embodiments, when WDM light corresponding to the first to the m-th channels is dispersed in the y-axis direction according to channel and also dispersed in the x-axis direction according to wavelength so as to be incident on the wavelength selection element 19 as m pieces of parallel light beams in a strip-like form, then incident regions R1 to Rm for receiving the light beams of the first to the m-th channels are each assumed to be a rectangular region as shown in FIG. 3. That is, the light beams applied to the incident regions R1 to Rm are essentially the WDM light beams of the first to the m-th channels developed over the xy plane according to channel i (i=1 to m) and wavelength band $\lambda_j$ (j=1 to n). In the optically variable filter array apparatus in accordance with the first and second embodiments, the selection of light having a desired wavelength can be made by choosing corresponding pixels for reflection. Next, the specific configuration of the wavelength selection element 19 will be explained.

The wavelength selection element 19 can be practically realized by using an LCOS (Liquid Crystal On Silicon)-based LC element. An LCOS element 19A has a built-in liquid crystal modulation driver located at the back of each pixel. Accordingly, the number of pixels can be increased, and thus, for example, the LCOS element 19A can be formed of a multiplicity of pixels arranged in a 1000×1000 lattice pattern. In the LCOS element 19A, since light beams are incident separately at different positions according to channel and wavelength, by bringing a pixel corresponding to the incident position of a target light beam into a reflective state, it is possible to select the optical signal thereof.

Figure 4A:
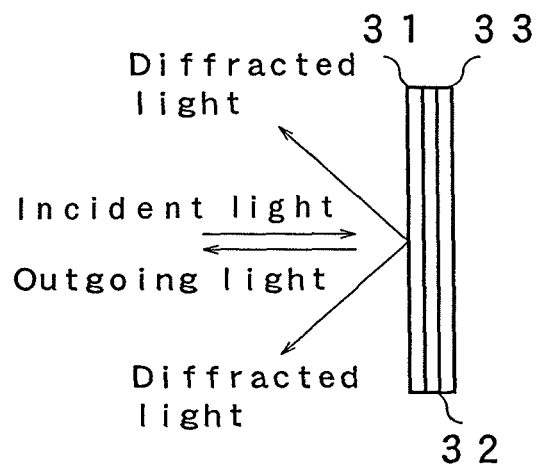
FIG. 4A is a diagram showing an example of a modulation mode for the LCOS element employed in the first and second embodiments of the present invention.

Now, as one of modulation modes applicable to the LCOS element 19A, a phase modulation mode will be explained. FIG. 4A is a schematic diagram showing the LCOS element 19A. The LCOS element 19A is composed of a transparent electrode 31, a liquid crystal 32, and a back reflection electrode 33 that are arranged in the order named, from the plane of incidence's side, along the z-axis direction in a layered structure. In the LCOS element 19A, since a plurality of pixels are assigned to constitute a single wavelength band of a single channel, it is possible to impart unevenness to a refractive index profile with respect to a plurality of pixels and thereby develop a diffraction phenomenon. Accordingly, by applying a voltage between the transparent electrode 31 and the back reflection electrode 33, the angles of diffraction of different frequency components can be controlled independently, so that input light with a specific wavelength can be simply reflected in the incident direction, and light of another wavelength components can be diffracted as unnecessary light and reflected in a direction different from the incident direction. Therefore, by controlling a voltage to be applied to each pixel, necessary pixels can be brought into a regularly-reflective state without causing diffraction.

Figure 4B:
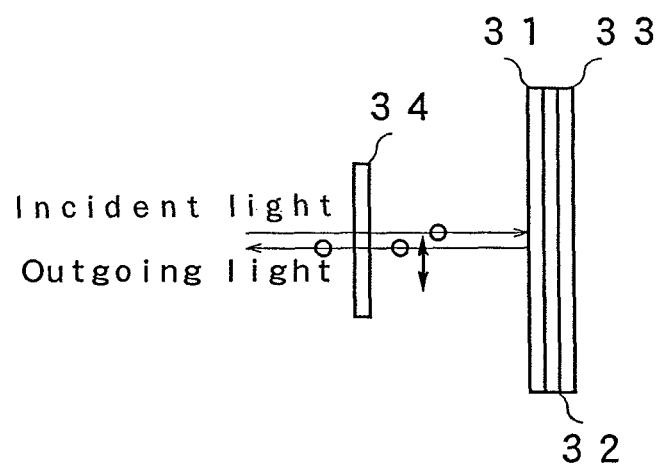
FIG. 4B is a diagram showing another example of the modulation mode for the LCOS element employed in the first and second embodiments of the present invention.

Next, as another modulation mode applicable to the LCOS element 19A, an intensity modulation mode will be explained. FIG. 4B is a diagram showing a wavelength selection method based on the intensity modulation mode. A polarizer 34 is placed on the plane of incidence for incoming light and outgoing light as well. The polarizer 34 brings incoming light into a specific polarized state as indicated by an circle in the diagram, and the polarized light is incident on the LCOS element 19A of reflection type. Also in this case, the LCOS element 19A is composed of a transparent electrode 31, a liquid crystal 32, and a back reflection electrode 33. With the incidence of light on the LCOS element 19A, a difference in index of double refraction in the liquid crystal between the electrodes can be controlled on the basis of the conditions of voltage application. Accordingly, the polarization state of reflected light can be varied by adjusting to-be-applied voltages independently. Then, it is determined whether the plane of polarization is rotated or retained at the time of voltage control in accordance with orientational ordering among liquid-crystal molecular components. For example, assuming that the plane of polarization is retained in the absence of voltage application, then the light indicated by the circle is simply reflected. On the other hand, in the presence of voltage application, the plane of polarization is rotated to effect reflection, and the reflected light is shielded by the polarizer 34. Therefore the selection of incoming light can be achieved by controlling voltages to be applied to the pixels. The selection of a plurality of given wavelength bands of a plurality of given WDM signal light beams can be made by bringing a given number of corresponding pixels into a reflective state.

The LCOS element 19A employed in the first and second embodiments has, for example, a 3 m×3 n pixel arrangement with respect to WDM signals of m channels each having n wavelength bands ranging from $\lambda_1$ to $\lambda_n$. In this way, when it is desired to select a specific wavelength of a WDM signal corresponding to a specific channel, for example, a signal in a wavelength band $\lambda_j$ of WDM light corresponding to a channel i as shown in FIG. 5A, by bringing 9 dots of pixels, namely 3i to 3i+2 and 3j to 3j+2, into a regularly-reflective state, the wavelength of the channel i can be selected. In FIG. 5A, a pixel to be brought into a reflective state is represented as a black box. When light is incident on a pixel in a reflective state of the LCOS element 19A, then the incident light is simply reflected therefrom to be acquired at the output side. Meanwhile, light with a non-target wavelength incident on an unselected pixel is diffracted or shielded and is therefore no longer return to the optical fibers 15-1 to 15-m. Thus, in the case of selecting 9 pixels corresponding to a specific wavelength band, as shown in FIG. 6A, as a filter configuration, there is obtained a flat-top type spectral waveform pattern characterized by inclusion of signal spectral components and low crosstalk between adjacent channels.

Moreover, in the LCOS element 19A, the filter configuration can be determined freely by adjusting the number of pixels to be brought into an ON state as well as an OFF state. That is, in FIG. 5A, by selecting one of the pixels placed in a 3×3 arrangement corresponding to a specific wavelength band of a specific channel, it is possible to keep the filter at a low level in respect of its transmittance. Further, by selecting part of the 9 pixels covering the wavelength band $\lambda_j$ of the channel i in the wavelength selection element 19, it is possible to obtain a desired wavelength. In this way, when light is incident on the wavelength selection element 19, a passband width corresponding to the width of the reflection region can be obtained. That is, as shown in FIG. 5B, out of the 9 pixels covering the wavelength band $\lambda_j$ of the channel i, centrally located 3 pixels are brought into a reflective state. This makes it possible to attain narrow-range selection characteristics as shown in FIG. 6B for selecting wavelengths forming central portions of the wavelength band $\lambda_j$.

Moreover, as shown in FIG. 5C, pixels adjacent to the central 3 pixels are also brought into a reflective state at the same time. This makes it possible to attain near-Gaussian selection characteristics as shown in FIG. 6C in which the passband is slightly widened.

Further, as shown in FIG. 5D, in addition to the 9 pixels covering the wavelength band $\lambda_j$, part of the pixels adjacent thereto is also brought into a reflective state. This makes it possible to render the passband even wider as shown in FIG. 6D.

The transmittance can be continuously varied by adjusting the level of a voltage to be applied to each of the pixels of the LCOS element 19A. Accordingly, by controlling pixels subjected to voltage application and voltage level, various filter characteristics can be attained.

It is noted that, although the pixels placed in the 3×3 arrangement are assigned to each wavelength band of a single channel of a WDM signal in the first and second embodiments, by increasing the number of pixels to be assigned or by exercising voltage level control on a pixel-by-pixel basis, it is possible to control filter characteristics more precisely.

Figure 7:
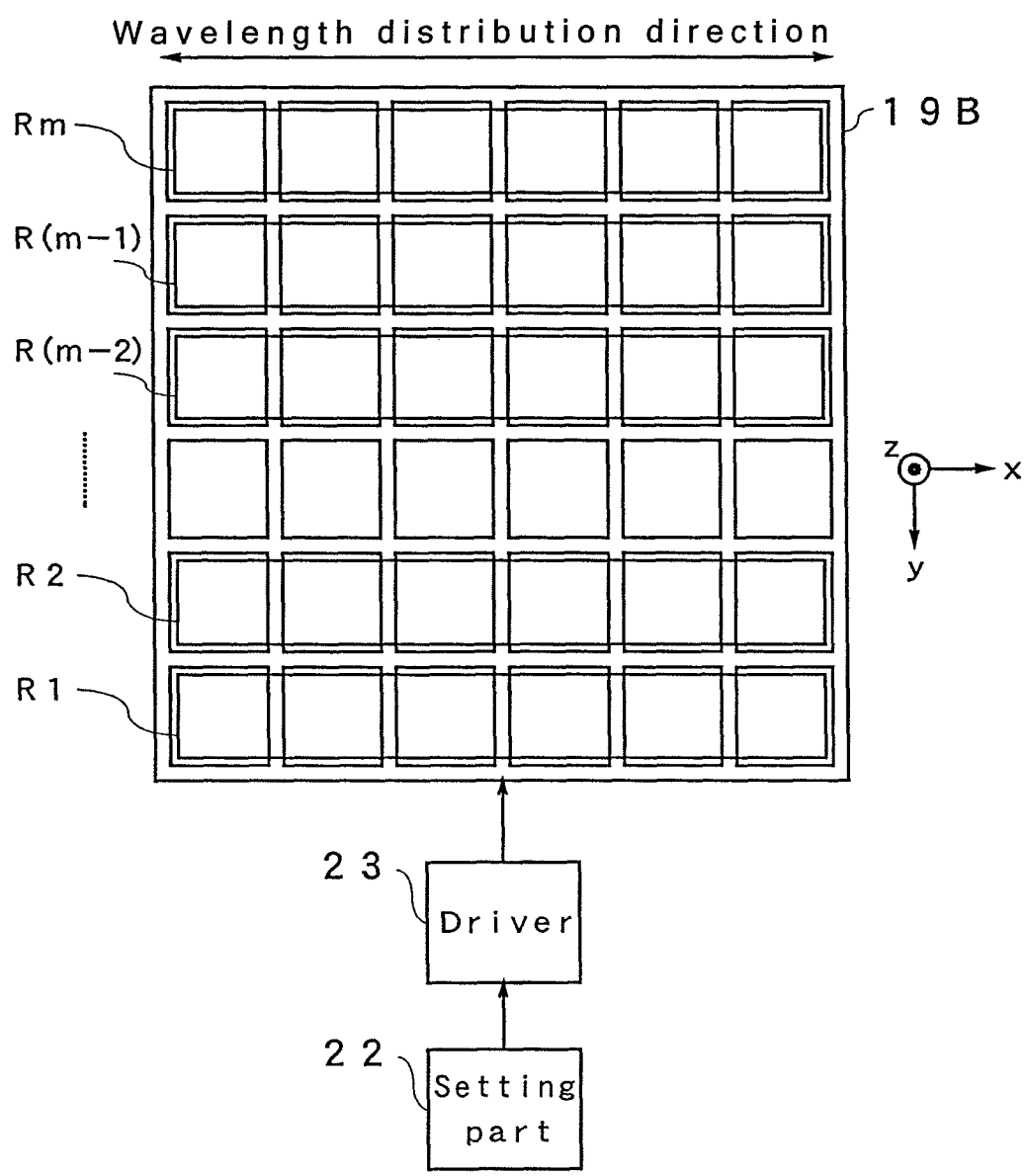
FIG. 7 is a diagram showing an example of a 2D electrode array in accordance with the first and second embodiments of the present invention.

Moreover, as the wavelength selection element 19, a liquid crystal element 19B can also be used that has a 2D electrode array instead of a LCOS structure. In the LCOS element, there is incorporated a liquid crystal driver located at the back of each pixel. On the other hand, in the 2D-electrode array liquid crystal element 19B, a driver 23 for liquid crystal modulation is disposed externally of the element. This makes it difficult to provide as many pixels as provided in the LCOS element. Accordingly, it is desirable to adopt a m×n pixel arrangement as shown in FIG. 7 in conformity with a two-dimensional m×n development of n wavelengths ranging from $\lambda_1$ to $\lambda_n$ of WDM light corresponding to m channels. In this case, although the filter configuration cannot be changed, desired wavelength bands of a plurality of arbitrarily selected channels from among m channels can be selected. Moreover, in this case, only the foregoing intensity modulation mode can be implemented. Further, the level of transmission can be varied by making changes to the level of voltages to be applied to the pixels.

Figure 8:
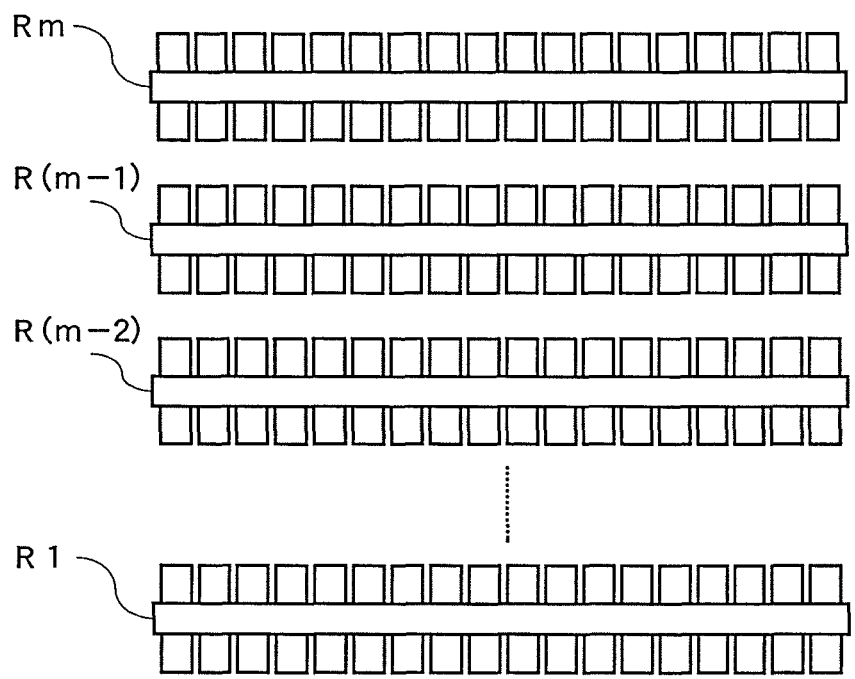
FIG. 8 is a diagram showing an example of a MEMS element in accordance with the first and second embodiments of the present invention.
Figure 9:
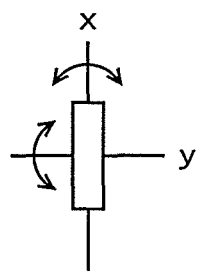
FIG. 9 is a diagram showing a single pixel of the MEMS element of the embodiment.

Moreover, the wavelength selection element 19 can be constructed of a MEMS element 19C. In this case, as shown in FIG. 8, a multiplicity of MEMS mirrors formed of MEMS elements are arranged at different positions on the xy plane according to channel and wavelength. At this time, each of the pixels of the MEMS mirror is assigned to a single wavelength of WDM signal light on a one-on-one basis. In this way, as shown in FIG. 9, by rotating each of the pixels of the MEMS element 19C about the x axis or the y axis, it is possible to eliminate unnecessary WDM signals and thereby select necessary WDM signals only. Also in this case, a plurality of wavelength bands can be selected arbitrarily with respect to WDM light corresponding to a plurality of given channels. Moreover, the angle of a mirror can be adjusted by changing the level of a voltage to be applied to each pixel, wherefore the amount of light transmission can be determined freely. Accordingly, also in this case, the intensity level of light in a selected wavelength band can be controlled. Moreover, in the case of adopting MEMS, pixels of a plurality of MEMS elements can be assigned to a single wavelength band. By doing so, just as with the LCOS element, by controlling voltages to be applied to the pixels corresponding to a single wavelength band, wavelength selection characteristics of various filter configurations can be attained.

Third Embodiment

Figure 10A:
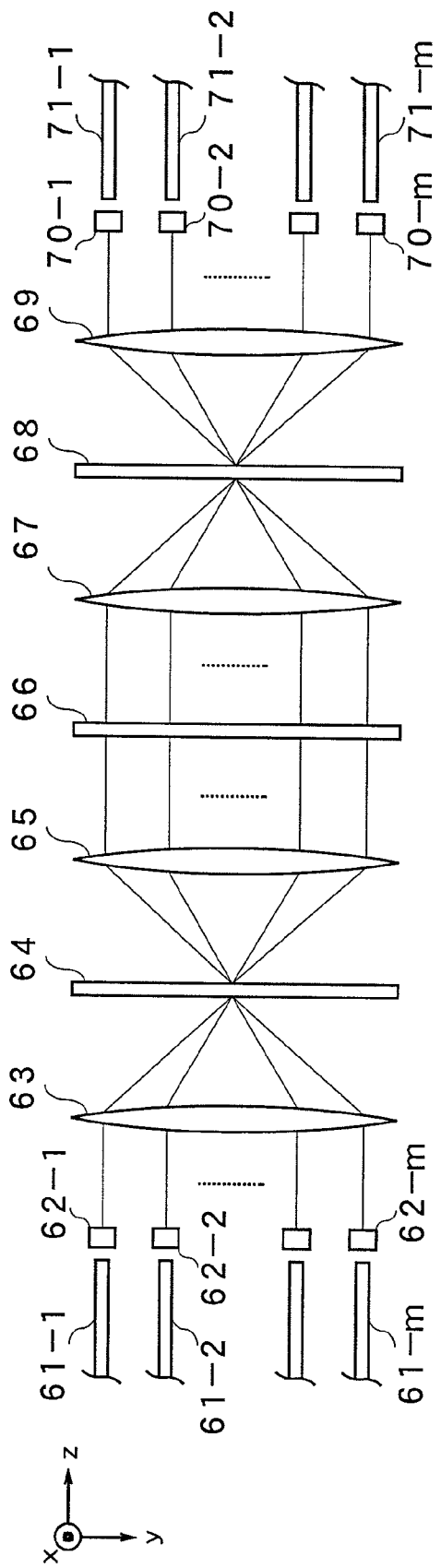
FIG. 10A is a diagram showing the optical arrangement of a transmission-type optically variable filter in accordance with a third embodiment of the present invention as seen in the x-axis direction.
Figure 10B:
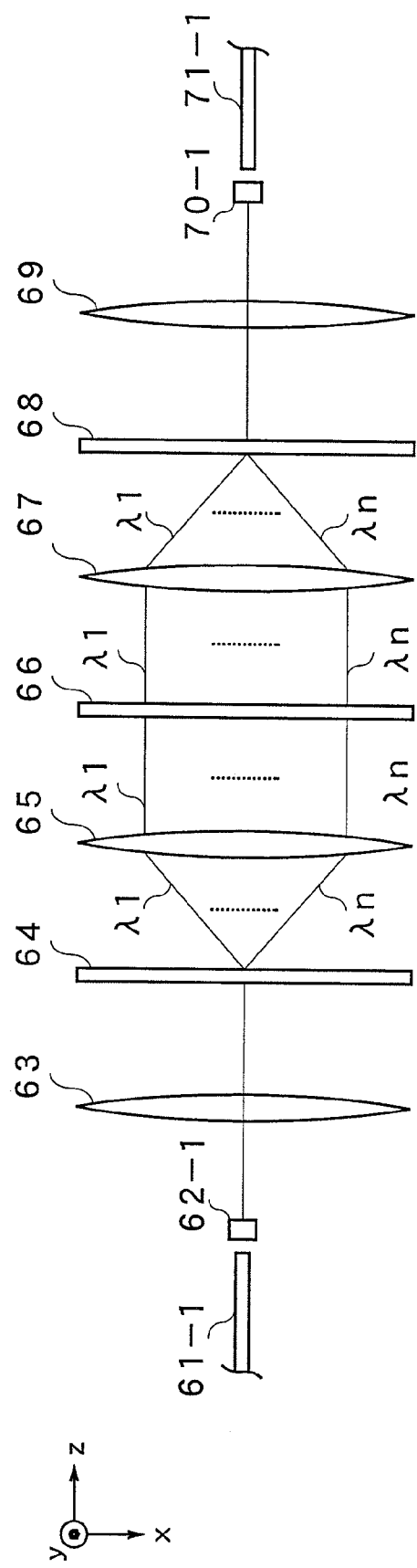
FIG. 10B is a diagram showing the optical arrangement of the optically variable filter as seen in the y-axis direction.

Next, a description will be given as to a transmission-type optically variable filter array apparatus in accordance with a third embodiment of the present invention. In FIG. 10A, incoming light is WDM signal light corresponding to m channels, and the light beams are directed from optical fibers 61-1 to 61-m, respectively, to collimator lenses 62-1 to 62-m, respectively, so as to be fed to a lens 63 as parallel light beams. The lens 63 condenses the WDM light beams of different channels in the y-axis direction so that they can converge to a point. At this light condensing position is disposed a first wavelength dispersion element 64. The optical fibers 61-1 to 61-m, the collimator lenses 62-1 to 62-m, and the lens 63 constitute entrance sections for receiving the beams of WDM signal light of the first to m-th channels. The first wavelength dispersion element 64, just like the wavelength dispersion element of the first embodiment, can be constructed of a diffraction grating or a prism, or can be constructed of a combination of a diffraction grating and a prism. As shown in FIG. 10B, the wavelength dispersion element 64 allows light beams to exit therefrom in different directions on the xz plane according to their wavelengths. The light beams are each incident on a lens 65. the distance between the wavelength dispersion element 64 and the lens 65 is equal to a focal length f1 of the lens 65. The lens 65 is a first light condensing element for condensing light beams dispersed on the xy plane in a direction parallel to the x axis. Moreover, a wavelength selection element 66 is disposed perpendicularly to the optical axis of the lens 65. The wavelength selection element 66 effects transmission of incoming light in a selective manner, which will hereinafter be described in detail. The light transmitted through the wavelength selection element 66 is incident on a lens 67. A pair of the lens 65 and the first wavelength dispersion element 64 and a pair of the lens 67 and a second wavelength dispersion element 68 are arranged in plane-symmetrical relation with respect to the xy plane at the center of the wavelength selection element 66. The lens 67 is a second light condensing element for condensing parallel light beams on the xz plane. The wavelength dispersion element 68 effects the synthesis of light beams of different wavelength components coming from different directions so that they can exit therefrom in a synthesized state. The synthesized light from the wavelength dispersion element 68 is directed to a lens 69 whereby it is turned into discrete WDM light beams according to channel in the y axis direction. The WDM light beams are each parallel to the z axis. The WDM light beams of different channels are fed, through collimator lenses 70-1 to 70-m, respectively, to optical fibers 71-1 to 71-m, respectively. The lens 69, the collimator lenses 70-1 to 70-m, and the optical fibers 71-1 to 71-m constitute exit sections for a plurality of channels that allow the exit of WDM signals with a selected wavelength on a channel to channel basis.

(Configuration of Wavelength Selection Element)

Next, the wavelength selection element 66 employed in the transmission-type optically variable filter array apparatus in accordance with the third embodiment will be explained. The wavelength selection element 66 is, just like the wavelength selection element shown in FIG. 3, designed as an element having a structure composed of pixels two-dimensionally arranged in a K- by L-dot matrix. Moreover, a setting section 22 is connected, via a driver 23, to the wavelength selection element 66. The setting section 22 determines which pixel is used to transmit light on the xz plane in accordance with a selected wavelength of a selected channel.

Also in the third embodiment, when WDM light corresponding to the first to the m-th channels is dispersed in the x-axis direction according to wavelength and also dispersed in the y-axis direction according to channel so as to be incident on the wavelength selection element 66 as m pieces of parallel light beams in a strip-like form, then incident regions R1 to Rm for receiving the light beams of the first to the m-th channels are each assumed to be a rectangular region as shown in FIG. 3. That is, the light beams applied to the incident regions R1 to Rm are essentially the WDM light beams of the first to the m-th channels developed over the xy plane according to channel i (i=1 to m) and wavelength band $\lambda_j$ (j=1 to n). In the optically variable filter array apparatus in accordance with the third embodiment, the selection of light having a desired wavelength can be made by choosing corresponding pixels for transmission. Next, the specific configuration of the wavelength selection element 66 will be explained.

The wavelength selection element can be practically realized by using an LCOS (Liquid Crystal On Silicon)-based LC element. An LCOS element 66A has a built-in liquid crystal modulation driver 23 located at the back of each pixel. Accordingly, the number of pixels can be increased and thus, for example, the LCOS element 66A can be formed of a multiplicity of pixels arranged in a 1000×1000 lattice pattern. In the LCOS element 66A, since light beams are incident separately at different positions according to channel and wavelength, by bringing a pixel corresponding to the incident position of a target light beam into a transmissive state, it is possible to select the optical signal thereof.

Now, as one of modulation modes applicable to the LCOS element 66A, a phase modulation mode will be explained. FIG. 11A is a schematic diagram showing the LCOS element. The LCOS element is composed of a transparent electrode 81, a liquid crystal 82, and a transparent electrode 83 that are arranged in the order named, from the plane of incidence's side, along the z-axis direction in a layered structure. In the LCOS element 66A, since a plurality of pixels are assigned to constitute a single wavelength band of a single channel, it is possible to impart unevenness to a refractive index profile with respect to a plurality of pixels and thereby develop a diffraction phenomenon. Accordingly, by applying a voltage between the transparent electrode 81 and the transparent electrode 83, the angles of diffraction of different frequency components can be controlled independently, so that input light with a specific wavelength can be caused to travel in a straight line in the z-axis direction and eventually pass through the element, and light of another wavelength components can be diffracted as unnecessary light in a direction different from the z-axis direction. Therefore, by controlling a voltage to be applied to each pixel, necessary pixels can be brought into a transmissive state without causing diffraction.

Next, as another modulation mode applicable to the LCOS element, an intensity modulation mode will be explained. FIG. 11B is a diagram showing a wavelength selection method based on the intensity modulation mode. A polarizer 84 is placed on the plane of incidence for incoming light. The polarizer 84 brings incoming light into a specific polarized state as indicated by a circle in the diagram, and the polarized light is incident on the LCOS element 66A. Also in this case, the LCOS element is composed of a transparent electrode 81, a liquid crystal 82, and a transparent electrode 83. A polarizer 85 is placed on the optical axis of the outgoing light transmitted through the LCOS element. The polarizer 85 allows the exit of only light in a specific polarized state as indicated by the circle in the diagram. With the incidence of light on the LCOS element, a difference in index of double refraction in the liquid crystal between the electrodes can be controlled on the basis of the conditions of voltage application. Accordingly, the polarization state of transmitted light can be varied by adjusting to-be-applied voltages independently. Then, it is determined whether the plane of polarization is rotated or retained at the time of voltage control in accordance with orientational ordering among liquid-crystal molecular components. For example, assuming that the plane of polarization is retained in the absence of voltage application, then the light indicated by the circle is simply transmitted. On the other hand, in the presence of voltage application, the plane of polarization is rotated to effect transmission, and the transmitted light is shielded by the polarizer 85. Therefore the selection of incoming light can be achieved by controlling voltages to be applied to the pixels. The selection of a plurality of given wavelength bands of a plurality of given WDM signal light beams can be made by bringing a given number of corresponding pixels into a transmissive state.

Next, as the wavelength selection element 66, a liquid crystal element can be used that has a 2D electrode array instead of the LCOS structure. In the LCOS element, there is incorporated a liquid crystal driver located at the back of each pixel. On the other hand, in the 2D-electrode array liquid crystal element 66B, a driver 23 for liquid crystal modulation is disposed externally of the element. This makes it difficult to provide as many pixels as provided in the LCOS element. Accordingly, just as in the case of FIG. 7, it is desirable to adopt a m×n pixel arrangement in conformity with a two-dimensional m×n development of n wavelengths ranging from $\lambda_1$ to $\lambda_n$ of WDM light corresponding to m channels. In this case, although the filter configuration cannot be changed, desired wavelength bands of a plurality of channels selected arbitrarily from among m channels can be selected. Moreover, in this case, only the foregoing intensity modulation method can be implemented. Further, the level of transmission can be varied by making changes to the level of voltages to be applied to the pixels.

As particularized heretofore, according to the present invention, by making various changes to the reflection characteristics and transmission characteristics of the wavelength selection element, it is possible to select light with a desired wavelength with respect to each of multi-channel WDM signals on an individual basis. Moreover, the use of a wavelength selection element in which a plurality of pixels are assigned to each wavelength makes it possible to vary wavelength selection characteristics freely. Thus, the optically variable filter array apparatus can be used as a main constituent component of a node having WDM light Add-Drop function.

What is claimed is:

1. An optically variable filter array apparatus comprising:
    an entrance/exit section for a plurality of channels arranged along a direction of a y axis, which receives WDM signal light beams of a first to m-th channels, each of which is composed of multi-wavelength light, and allows exit of optical signals of selected multiplex wavelengths on a channel to channel basis;
    a wavelength dispersion element which spatially disperses said WDM signal light beams of different channels according to their wavelengths;
    a light condensing element which condenses the WDM light beams of different channels dispersed by said wavelength dispersion element on a two-dimensional xy plane;
    a wavelength selection element which has a multiplicity of pixels that are arranged in a direction of an x axis according to wavelength, are placed so as to receive incoming light beams of m channels arranged at different positions with respect to the y axis so as to be developed over the xy plane, and are arranged in a lattice pattern on the xy plane, and which selects light in a desired number of wavelength bands with respect to a desired number of said light beams by changing reflection characteristics of each of the pixels arranged in a two-dimensional fashion; and
    a wavelength selection element driving unit which drives an electrode of each of the pixels arranged in the x-y directions of said wavelength selection element to control light reflection characteristics of a pixel lying at a predetermined position in the x-axis direction as well as in the y-axis direction.

2. The optically variable filter array apparatus according to claim 1, wherein said entrance/exit section includes circulators for feeding said incident WDM signals of the first to m-th channels to said wavelength dispersion element and effecting separation of reflection characteristics-controlled WDM signal light produced from said wavelength dispersion element.

3. The optically variable filter array apparatus according to claim 1, wherein said wavelength selection element is inclined relative to the x-axis direction.

4. The optically variable filter array apparatus according to claim 1, wherein
    said wavelength selection element is a two-dimensional liquid crystal element, and
    said wavelength selection element controls a voltage to be applied to each pixel in accordance with a wavelength of a channel to be selected.

5. The optically variable filter array apparatus according to claim 4, wherein said wavelength selection element is an LCOS element.

6. The optically variable filter array apparatus according to claim 5, wherein said LCOS element is so designed that a plurality of pixels are assigned to an incident position where light in a single wavelength band of a single channel of a WDM signal enters.

7. The optically variable filter array apparatus according to claim 4, wherein said wavelength selection element is a two-dimensional liquid crystal array element.

8. The optically variable filter array apparatus according to claim 1, wherein said wavelength selection element is a MEMS array having a plurality of pixels arranged in a two-dimensional fashion.

* * * * *